Feb. 25, 1969  F. KRAUJALIS  3,429,191
VARIABLE STOCK FEEDER
Filed March 30, 1967  Sheet 2 of 3
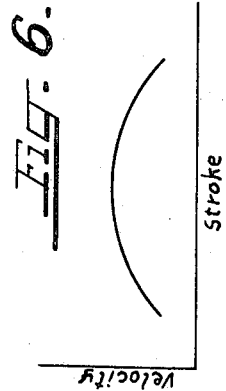
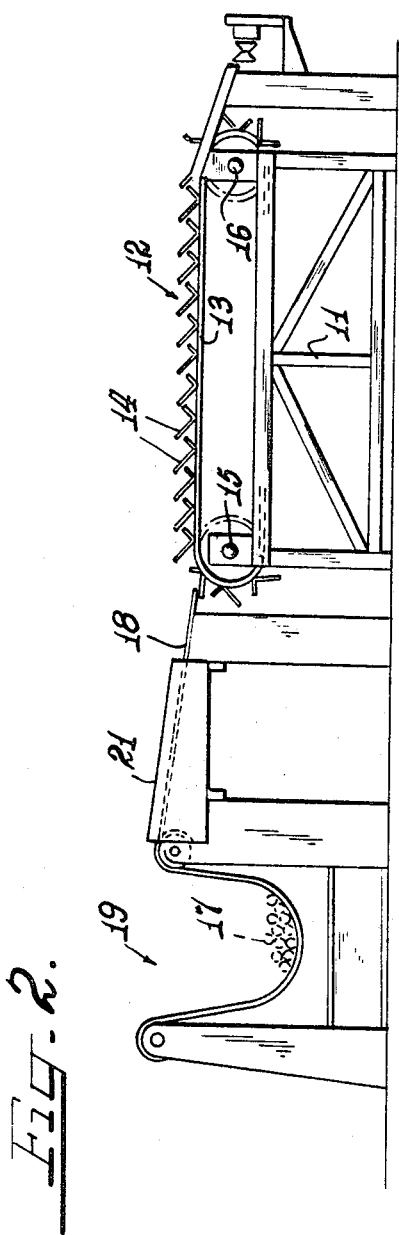
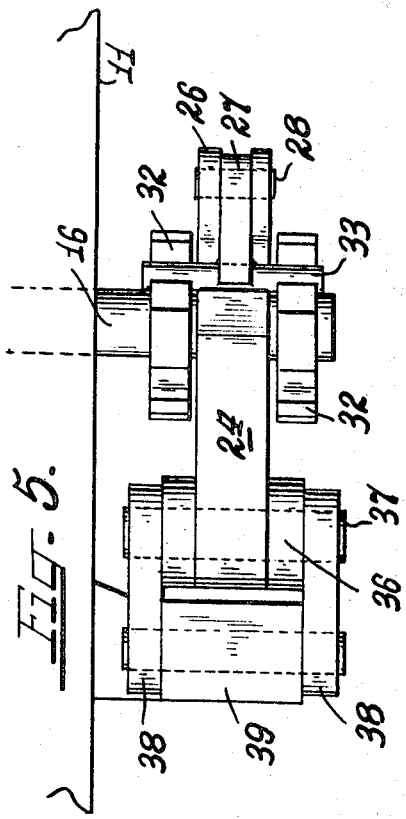
INVENTOR.
Felix Kraujalis.
BY
Charles H. Redman
Atty.

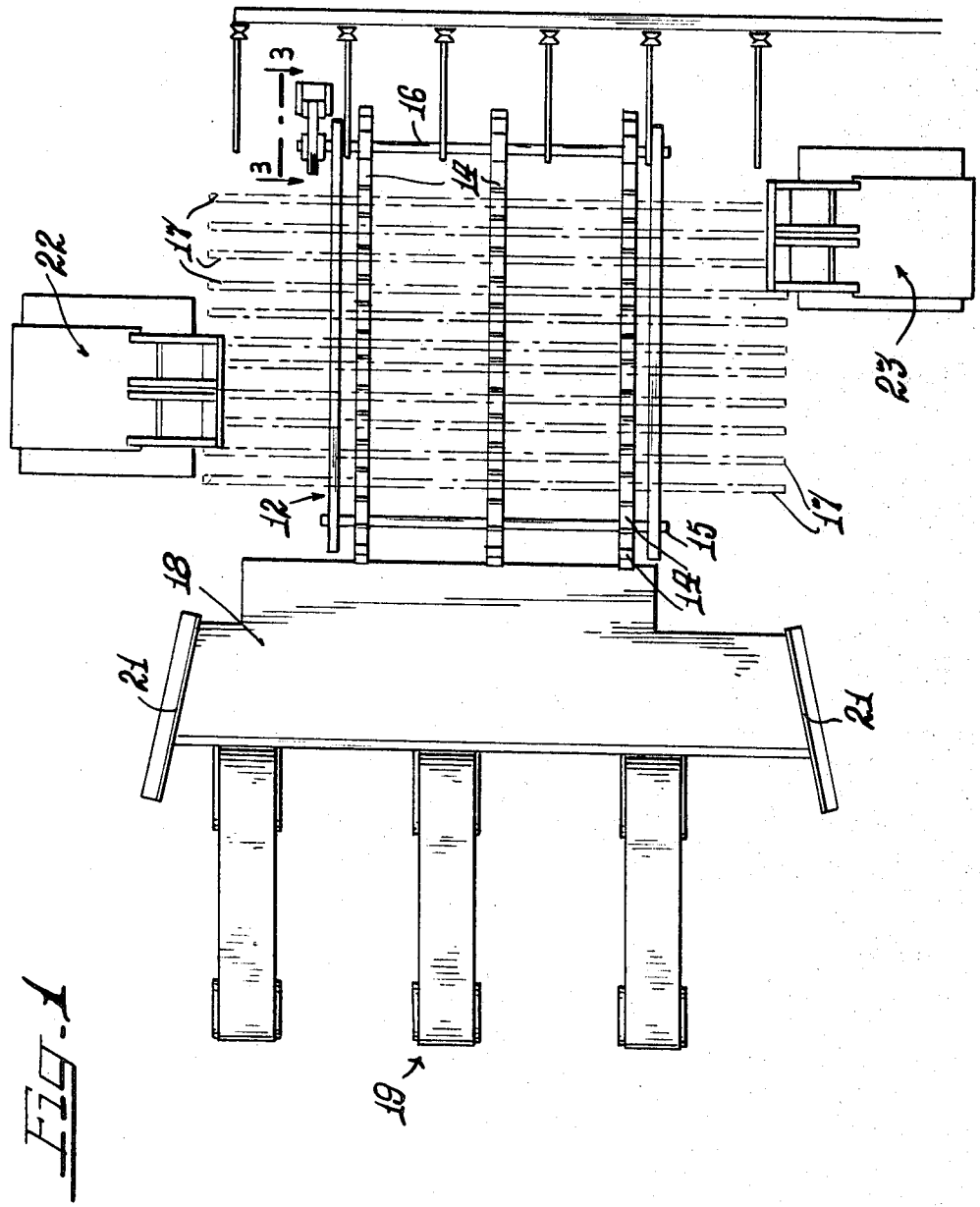

Feb. 25, 1969 F. KRAUJALIS 3,429,191
VARIABLE STOCK FEEDER
Filed March 30, 1967 Sheet 3 of 3

INVENTOR.
Felix Kraujalis.
BY
Charles H. Redman
Atty.

United States Patent Office 3,429,191
Patented Feb. 25, 1969

3,429,191
VARIABLE STOCK FEEDER
Felix Kraujalis, Aurora, Ill., assignor to Pines Engineering Co., Inc., Aurora, Ill., a corporation of Illinois
Filed Mar. 30, 1967, Ser. No. 627,117
U.S. Cl. 74—142
Int. Cl. F16h *27/02*
10 Claims

ABSTRACT OF THE DISCLOSURE

Intermittent drive mechanism for a variable stock feeder or like apparatus, which includes means to develop a low velocity starting speed, a high velocity intermediate speed and a low velocity stopping speed.

---

Drive mechanisms such as star wheel type drives for an incrementally rotatable shaft have the disadvantage of producing a high speed starting velocity, a reduced intermediate velocity and a high speed stopping velocity. Such movement is suitable for incorporation in many types of apparatus. However, applicant has found that especially in apparatus for intermediately feeding a continuous stream of lengths of tubular stock to work stations where a machine operation, such as de-burring and de-dimpling of the tube ends, is to be accomplished, it is most desirable to avoid abrupt starts and stops as these cause the tubular stock to bounce in their carriers and they become misaligned endwise or be otherwise displaced. The drive mechanism herein disclosed and embodying the invention is constructed and assembled in such manner that there is a low velocity starting, a high intermediate velocity and a low stopping velocity. This mode of advance for the tubular stock prevents them from being "bounced" or otherwise disturbed as occurs with high velocity starts and stops.

Otherwise stated, the present drive includes a novel mechanical connection between the power source, here an air cylinder-piston assembly, and the pawl that engages a star wheel on the driven conveyor shaft. In the present exemplary disclosure the star wheel drive mechanism is mounted on conveyor apparatus that operates to intermittently convey a succession of lengths of tubular stock to the work stations. When a piece of tubular stock reaches a work station the conveyor drive is rendered inoperative. As soon as the work is completed at the station, the conveyor drive actuates to advance the next successive piece of tubular stock to the work station and to ultimately discharge the finished tube from the apparatus. Because the work is done on the tube ends, as when de-burring or de-dimpling, it is essential that their position on the conveyor means is not altered during the intermediate feed operations. Hence the present use of drive mechanism that insures that the tubular stock is not disturbed; which mechanism insures that start and stop velocities are relatively low while the intermediate velocity is comparatively high so as not to slow down production.

It is therefore an object of the invention to provide a novel drive mechanism of the character referred to.

Another object is to provide conveyor apparatus for intermittent feeding of work pieces with novel speed control mechanism.

Another object of the invention is to provide a novelly constructed and assembled star wheel type of drive mechanism.

The structure by means of which the above noted and other objects and advantages of the invention are attained will be described in the following specification, taken in conjunction with the accompanying drawings, showing a preferred illustrative embodiment of the invention, in which:

FIG. 1 is a plan view of apparatus used to convey a succession of lengths of tubular stock to work stations.

FIG. 2 is a side elevational view of the apparatus.

FIG. 5 is a plan view of the drive mechanism as seen in FIG. 3.

FIG. 6 is a representative stroke-velocity graph.

Figure 3:
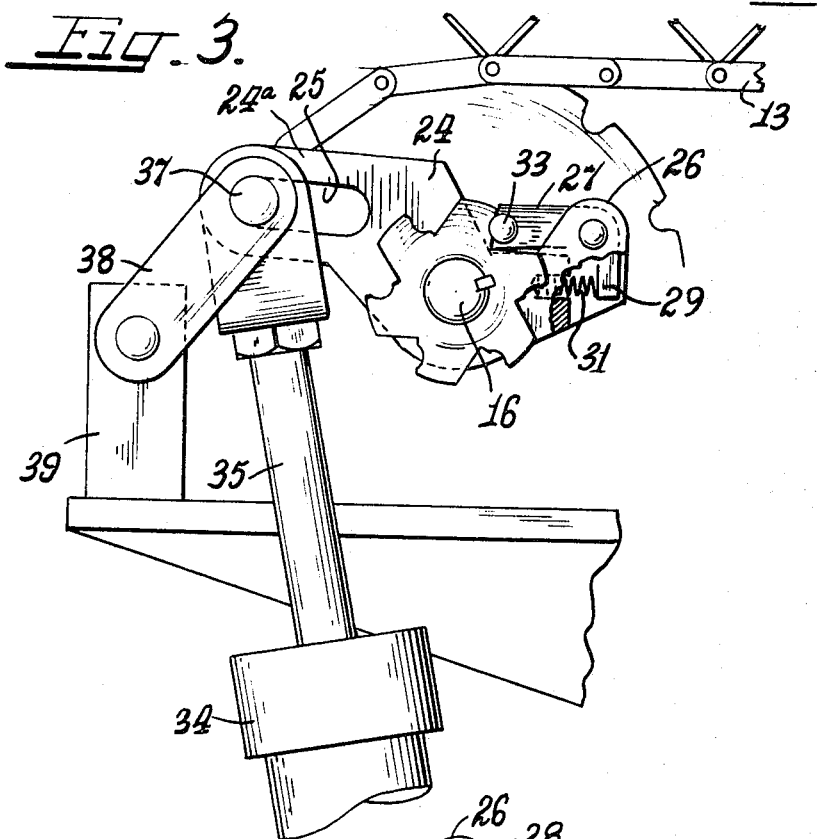
FIG. 3 is an enlarged elevational view of the conveyor drive mechanism, as viewed substantially on line 3—3 of FIG. 1.

Referring to the disclosure in the accompanying drawings of an exemplary apparatus for feeding a continuous stream of work pieces, such as lengths of tubular stock, to work stations, the apparatus includes a frame 11 upon which is journalled an endless conveyor 12, here comprised of three endless chains 13, each having spaced therealong a series of V-shaped carriers 14. These chains are trained over sprockets carried by lateral shafts 15–16. In use, these carriers are adapted to have seated therein lengths of tubular stock 17 which tubular stock may be delivered thereto down an inclined platform 18. Tubular stock may be delivered to the platform by a belt lift apparatus generally indicated at 19, which initially receives a load of tubular stock and is progressively elevated so as to spill the load onto the platform 18 along which they slide to be deposited one in each set of V-shaped carriers 16. Guides 21 at the edges of platform 18 align the ends of the tubular stock at its fall into the carriers.

The conveyor chains 13 are operated in unison, intermittently, so as to successively advance each tubular work piece to work stations where the advance is halted to permit work to be performed on their ends. For example, in the present disclosure, a work station 22 is provided at one side of the apparatus at which station one tubular work piece end is de-burred while an end of the next adjacent tubular work piece is de-dimpled. As they are advanced further they are carried into a second work station 23 where the other end of one of the tubular work pieces is de-burred while the adjacent work piece is de-dimpled. The drive is such that the conveyor 12 advances a distance equal to the spacing between adjacent tubular work pieces each time it is actuated. This operation is repeated as long as there are any tubular work pieces in the carriers. Because the position of the tubular work pieces axially is important to proper association with the work tools, it is most important that the tubular work pieces be not disturbed while conveying them to the work stations. Such disturbance frequently occurs in known apparatus because of the high velocity starts and stops of the conveyor means which jars or "bounces" the tubular work pieces in the carriers to such extent that they become misaligned or perhaps displaced from their carriers. This could be minimized by slowing down the operation of the machine so as to avoid fast starts and stops. However, to do so materially reduces the capacity of the machine to produce finished work pieces.

The present invention is designed to maintain maximum capacity while avoiding sudden high velocity starts and stops that tend to dislodge the tubular work pieces in the carriers. To this end the improved drive means operates to institute low velocity starts, high velocity intermediate drive and low velocity stops. Such drive, which is operably conneced with one of the conveyor chain shafts, such as shaft 16, is operable to achieve the desired variation in velocity of the feed.

Figure 4:
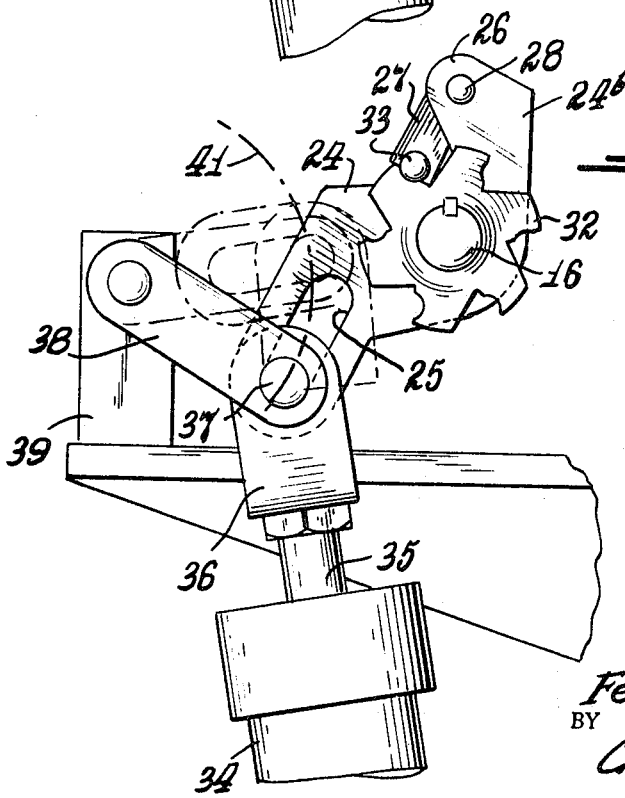
FIG. 4 is a view similar to FIG. 3, showing the parts in another operating position.

As best shown in FIGS. 3–5, the shaft 16 projects out of one side of the machine frame and has mounted thereon, for free rotation thereon, a lever 24. One end 24*a* of said lever extends radially from the shaft and is provided with a substantially radially disposed slot 25. The other end 24*b* of said lever is bifurcated to provide spaced ears 26 between which is mounted a pawl 27, journalled on a pin 28. The pawl has a tail portion 29 (FIG. 3) against which a spring 31 bears at all times to urge the pawl in a counterclockwise direction.

Also mounted on said shaft 16 and one on each side of lever 24, are a pair of star wheels 32. These wheels are keyed to the shaft and they are each engageable by a lateral pin 33 carried by pawl 27. It should be evident that when lever 24 is positively rotated in a counterclockwise direction about shaft 16, as from the FIG. 3 position into the FIG. 4 position, the pawl pin 33 will engage with the star wheels and rotate same in a counterclockwise direction for rotating the shaft 16 and advancing the conveyor chains 13.

Oscillatable rocking motion is imparted to lever 24 by means of a piston-cylinder assembly 34. As shown, its piston rod 35 carries a yoke 36 that embraces the end 24a of lever 24 and carries a pin 37 which is free to travel in slot 25. Also receiving said pin 37 therethrough are a pair of links 38 which are pivotally secured to a fixed standard 39 mounted on frame 11.

Upon viewing FIGS. 3 and 4, it will be observed that when piston rod 35 is drawn downwardly into its cylinder, the level 24 is rocked from the position shown in FIG. 3 into the position shown in full lines in FIG. 4. However, owing to the link 38 connection, the pin 37 will travel in slot 25 in an arcuate path, as at 41, assuming an intermediate position substantially as shown in broken lines in FIG. 4. It is thus apparent that when approaching the intermediate position from the FIG. 3 position, the amount of initial movement imparted to lever 24 is minimal, thus imparting slow but progressively increasing rotation to the conveyor shaft 16. As a pin 37 approaches the intermediate position (broken lines) the lever velocity has increased to maximum and as it passes through such position the maximum speed is progressively reduced so that when the stop position, shown in full lines in FIG. 4 is approached the speed velocity is again reduced to a minimum. A representative stroke-velocity graph is shown in FIG. 6. Such a stroke insures that the conveyor is started up with minimum shock and that stopping is also accomplished with minimum shock hence the likelihood of disturbing or "bouncing" the tubular work pieces is avoided. Operating speed is not however reduced owing to the development and maintenance of a maximum velocity during the intermediate stroke.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What is claimed is:
1. An intermittent drive assembly comprising, in combination, a rotatable shaft, a star wheel on said shaft, a pawl engaged with the star wheel, a movable carrier for said pawl, and means to actuate said carrier including means to impart low starting velocity, high intermediate velocity and low stopping velocity.

2. The drive assembly recited in claim 1, in which the rotatable shaft is intermittently operable to drive conveyor means.

3. The drive assembly recited in claim 1, in which the means to actuate said carrier comprises a piston-cylinder assembly.

4. The drive assembly recited in claim 1, in which the means to rotate the shaft includes a piston-cylinder assembly and the pawl carrier is actuable by said piston-cylinder assembly.

5. The drive assembly recited in claim 4, in which a slidable pivotal connection is provided between the pawl carrier and the piston-cylinder assembly.

6. The drive assembly recited in claim 4, in which the pawl carrier is slotted at one end and the piston-cylinder assembly is pivotally connected to the pawl carrier by a pin engaged in said slot.

7. The drive assembly recited in claim 4, in which means is provided to vary the operating relationship of the piston-cylinder assembly and the pawl carrier.

8. The drive assembly recited in claim 7, in which the means to vary the operating relationship comprises a link fixedly secured pivotally at one end.

9. The drive assembly recited in claim 4, in which the pawl carrier and piston-cylinder assembly are slidably connected and means is provided to control sliding to impart variable speed to operation of the pawl carrier.

10. The drive assembly recited in claim 4, in which the pawl carrier and piston-cylinder assembly are slidably connected pivotally and link means is provided to control sliding to impart variable speed to operation of the pawl carrier.

References Cited
UNITED STATES PATENTS

| | | | |
|---|---|---|---|
| 2,660,895 | 12/1953 | Waters | 74—128 |
| 2,715,840 | 8/1955 | Binks et al. | 74—128 |
| 2,910,318 | 10/1959 | Masur | 74—128 |
| 2,925,052 | 2/1960 | Glass | 74—128 |
| 3,300,697 | 1/1967 | Woodford | 74—128 |
| 3,341,138 | 9/1967 | Allen | 74—142 |

FRED C. MATTERN, JR., *Primary Examiner.*

W. S. RATLIFF, JR., *Assistant Examiner.*

U.S. Cl. X.R.

74—128